United States Patent [19]

Krohn et al.

[11] Patent Number: 5,458,494
[45] Date of Patent: Oct. 17, 1995

[54] REMOTELY OPERABLE TEACHING SYSTEM AND METHOD THEREFOR

[75] Inventors: Arye Z. Krohn; Moshe Kugel, both of Brooklyn, N.Y.

[73] Assignee: EduTech Research Labs, Ltd., Brooklyn, N.Y.

[21] Appl. No.: 110,585

[22] Filed: Aug. 23, 1993

[51] Int. Cl.⁶ .................................................. G09B 7/00
[52] U.S. Cl. ................... 434/336; 434/169; 434/307 R; 434/350; 379/96; 379/105; 364/419.01
[58] Field of Search ........................... 434/118, 169, 434/185, 307, 308, 319–321, 323, 327, 334–336, 350, 362; 379/94, 95, 96, 98, 105; 381/51; 364/419.05, 419.01, 419.2; 395/153, 155; 464/307 R

[56] References Cited

U.S. PATENT DOCUMENTS

| | | |
|---|---|---|
| 3,538,626 | 11/1970 | Frank . |
| 3,633,289 | 1/1972 | Hannah . |
| 3,654,708 | 4/1972 | Brudner . |
| 3,656,243 | 4/1972 | Segal et al. . |
| 3,685,169 | 8/1972 | Blau et al. . |
| 3,694,935 | 10/1972 | Friedman et al. . |
| 3,716,929 | 2/1973 | Barrabas . |
| 3,810,316 | 5/1974 | Lahlou . |
| 3,911,596 | 10/1975 | Yamauchi . |
| 3,987,484 | 10/1976 | Bosche et al. ..................... 434/307 X |
| 4,004,354 | 1/1977 | Yamauchi . |
| 4,079,365 | 3/1978 | Yamauchi . |
| 4,414,621 | 11/1983 | Bown et al. ..................... 434/307 X |
| 4,539,435 | 9/1985 | Eckmann . |
| 4,636,174 | 1/1987 | Andersen et al. . |
| 4,643,682 | 2/1987 | Migler . |
| 4,671,772 | 6/1987 | Slade et al. . |
| 4,705,479 | 11/1987 | Maron . |
| 4,759,717 | 7/1988 | Larochelle et al. . |
| 4,764,120 | 8/1988 | Griffin et al. . |
| 4,770,636 | 9/1988 | Buschke . |
| 4,785,472 | 11/1988 | Shapiro . |
| 4,798,543 | 1/1989 | Spiece . |
| 5,002,491 | 3/1991 | Ahrahamson et al. . |
| 5,133,560 | 7/1992 | Small ........................... 434/169 X |
| 5,195,033 | 3/1993 | Samph et al. .................... 434/323 X |
| 5,236,199 | 8/1993 | Thompson, Jr. ................... 379/98 X |
| 5,247,497 | 9/1993 | Cohn ............................ 379/95 X |
| 5,263,723 | 11/1993 | Pearson et al. ................... 379/95 X |
| 5,294,229 | 3/1994 | Hartzell et al. ................... 434/336 |

FOREIGN PATENT DOCUMENTS

| | | | |
|---|---|---|---|
| 0184880 | 7/1990 | Japan ............................ 434/307 |
| 0200053 | 8/1990 | Japan ............................ 434/350 |

*Primary Examiner*—Joe H. Cheng
*Attorney, Agent, or Firm*—Ostrolenk, Faber, Gerb & Soffen

[57] ABSTRACT

A remotely operable teaching system includes hardware for interfacing with the public telephone network and for accepting incoming telephone calls. The computer system accepts personal identification codes from calling students and allows the students to access predetermined portions of pre-recorded educational material stored in the computer system. The system generates reports of the incoming telephone calls which provide information about the use of the stored educational material by the students.

26 Claims, 11 Drawing Sheets

FIG. 2A (SAR01)

STUDENT ACTIVITY REPORT
ACADEMY DAY SCHOOL

TEACHER: Ms. Appleton  GRADE: 6  CLASS: 1  DATE: May 3, 1992

| LAST NAME | FIRST NAME | TIME ON | PROGRAM | MIN. | REW | FF | NL |
|---|---|---|---|---|---|---|---|
| Smith | John | 8:02 | 01 | 017 | 3 | 1 | |
| Smith | John | 8:19 | 03 | 005 | 0 | 1 | * |
| Smith | John | 8:24 | 02 | 008 | 1 | 4 | |
| Jones | James | 8:05 | 02 | 030 | 2 | 0 | |
| Brown | Edward | 8:15 | 02 | 025 | 6 | 0 | |

FIG. 2B (ISA01) INDIVIDUAL STUDENT ACTIVITY REPORT (DETAIL)
ACADEMY DAY SCHOOL

STUDENT NAME: Smith, John GRADE: 6 CLASS: 1 DATE: May - 1992

| DATE | TIME ON | PROGRAM | MIN. | REW | FF |
|------|---------|---------|------|-----|----|
| 01 | 8:02 | 01 | 17 | 3 | 1 |
| 01 | 8:19 | 03 | 05 | 0 | 1 |
| 01 | 8:24 | 02 | 08 | 1 | 4 |
| 02 | 8:05 | 02 | 30 | 2 | 0 |
| 03 | 8:15 | 02 | 25 | 6 | 0 |
| 05 | 8:21 | 01 | 15 | 2 | 3 |
| 06 | 8:23 | 04 | 28 | 5 | 0 |
| 07 | 8:40 | 01 | 15 | 3 | 1 |
| 07 | 8:55 | 01 | 10 | 0 | 2 |
| 08 | 9:22 | 02 | 18 | 2 | 4 |

FIG. 2C (ISA02)

INDIVIDUAL STUDENT ACTIVITY REPORT (SUMMARY)
ACADEMY DAY SCHOOL

STUDENT NAME: Smith, John  GRADE: 6  CLASS: 1  DATE: May - 1992

| DATE | TIME ON | # PROGRAM | MIN. |
|---|---|---|---|
| 01 | 8:02 | 03 | 31 |
| 02 | 8:05 | 01 | 30 |
| 03 | 8:15 | 02 | 25 |
| 05 | 8:21 | 01 | 15 |
| 06 | 8:23 | 02 | 28 |
| 07 | 8:40 | 02 | 35 |
| 08 | 9:22 | 01 | 18 |

SYSTEM CAPACITY REPORT
ACADEMY DAY SCHOOL

DATE: May 2, 1993

(SCR01)

| TIME | % OF CAPACITY USED |
|---|---|
| 5:00p | 05% |
| 5:05p | 05% |
| 5:10p | 10% |
| 5:15p | 05% |
| 5:20p | 15% |
| 5:25p | 25% |
| 5:30p | 25% |
| 5:35p | 55% |

FIG. 2E (QMR01)

QUIZ MARKING REPORT
ACADEMY DAY SCHOOL

QUIZ #: 02  SUBJECT: Math  TLT QUES: 20  POINTS PER QUES: 5
TEACHER: Ms. Appleton  GRADE: 6  CLASS: 1  DATE: May 3, 1992

| LAST NAME | FIRST NAME | TIME ON | TIME OFF | MIN. | Q # | S/A | C/A | T SCORE |
|---|---|---|---|---|---|---|---|---|
| Smith | John | 8:02 | 8:25 | 23 | 03 | 1 | 2 | |
| | | | | | 05 | 3 | 1 | |
| | | | | | 17 | 4 | 1 | 85% |
| Smith | John | 8:05 | 8:32 | 27 | | | | 95% |
| Smith | John | 8:15 | 8:35 | 20 | 02 | 1 | 3 | |
| Jones | James | | | | | | | |
| Brown | Edward | | | | | | | 100% |

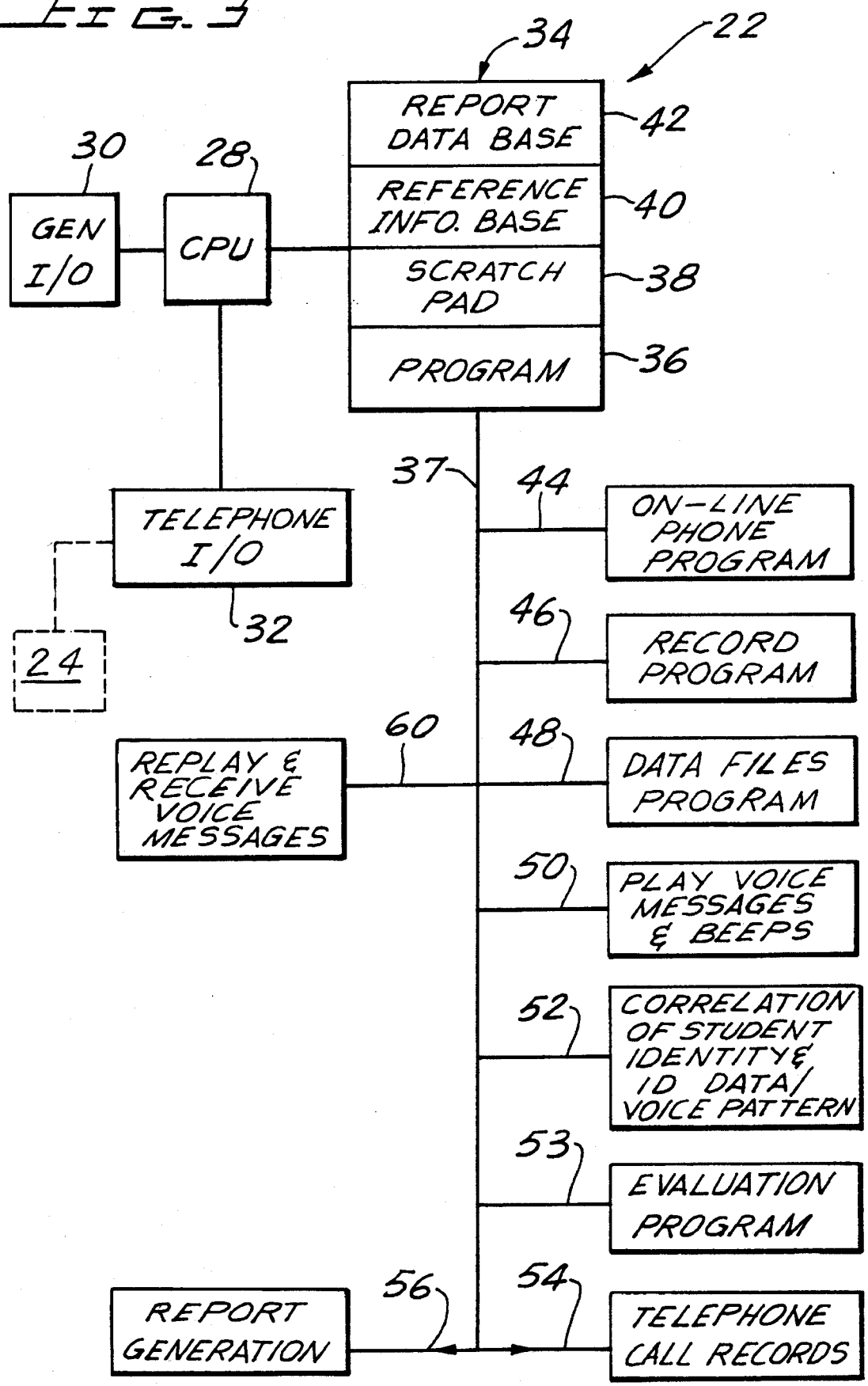

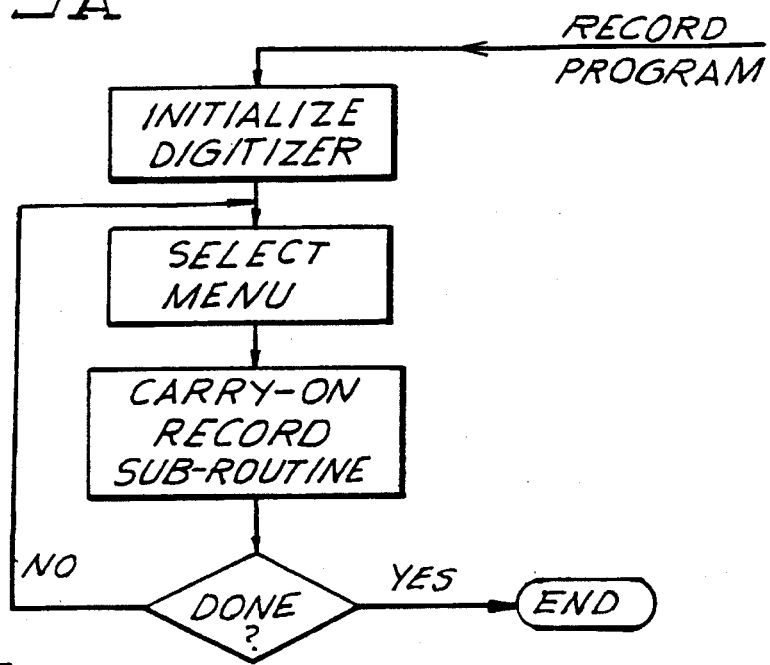
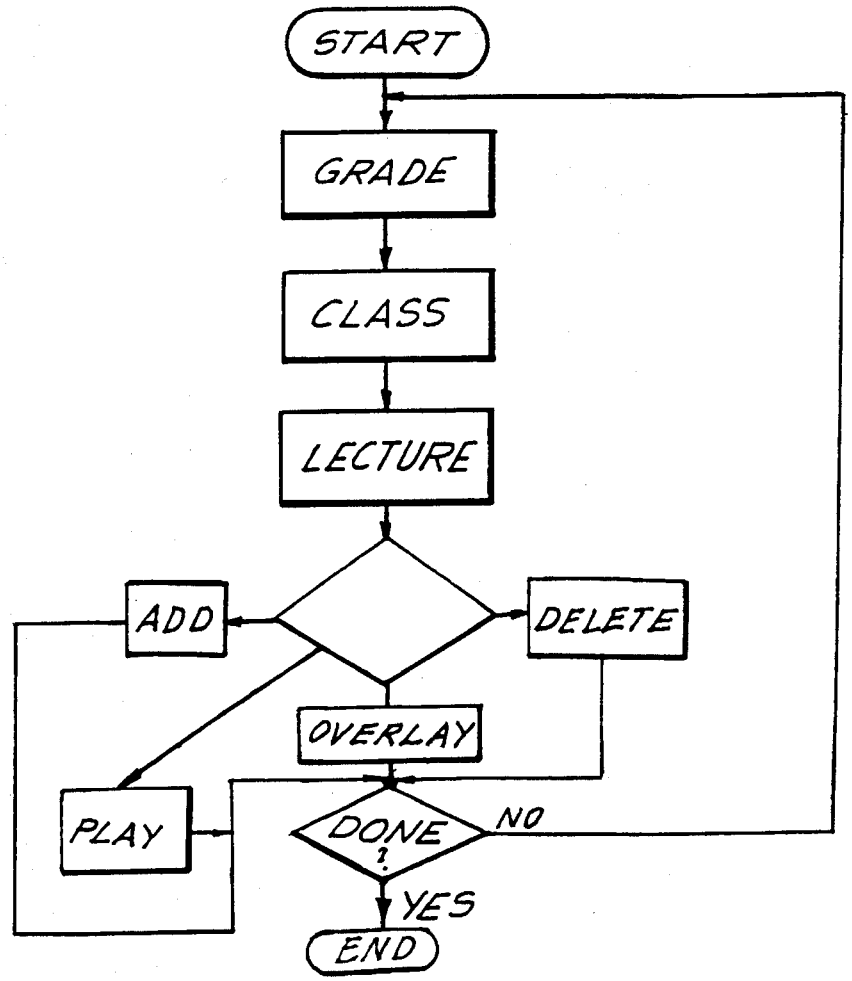

REMOTELY OPERABLE TEACHING SYSTEM AND METHOD THEREFOR

BACKGROUND OF THE INVENTION

The present invention relates to a system for providing educational material to students to promote self-study, review of lessons by students, and to facilitate and enhance monitoring of students' extra curricular work by educators. In particular, the system is designed to transmit educational material from a central location through the telephone network to students at other locations, and to generate reports on the use of the educational material by the students. The system provides a student-system interactive program which monitors and tests the students' utilization of the educational material, and stores and generates reports thereof.

The concept of providing educational material to remote users, such as students at home, is an idea of considerable importance. In the case of school students, often a parent cannot be involved in the homework study program of the student. However, students are expected to review daily the material that they have learned in class. It is therefore highly advantageous to be able to provide each individual student with the opportunity to access their teachers' pre-recorded lectures via a telephone, linked to a school computer which contains a central data base on which all pre-recorded lectures or other educational materials are stored.

Systems for providing educational material to users at remote locations are known in the art. However, there is a need for a system that monitors the students' activities while the students are using the educational material and which is able to generate reports that provide information about the use of the recorded educational material by the students.

SUMMARY OF THE INVENTION

Accordingly, it is a primary object of the present invention to provide a remotely operable teaching system and a method for providing recorded educational material to students and for monitoring the use of the educational material by the students. The remotely operable teaching system of the invention provides interactive access to students calling over a telephone network to educational material stored in a centrally located computer system. As used herein, the term interactive access is intended to be broadly defined. For example, the interactive access functions may include any one or combinations of the following functions:

1. Selection of material from the stored educational material for playback;
2. Control of the playback of the educational material, such as fast forward, rewind, pause and exit functions;
3. Obtaining information about the educational material that is being played back, such as title of the material, teacher's name, length of the material, time spent in reviewing the material, and so on; and
4. Obtaining a progress or status report regarding the particular study session.

It is a further object of the present invention to provide a system which is capable of generating daily, continuous or demand driven reports which provide information about the use of the recorded educational material by the students. These reports may also include the results of quizzes that are taken by the students during a study session.

A further object of the present invention is to provide a system which is capable of testing students' comprehension of the material provided to them by the remotely operable teaching system. This object of the invention includes testing the students by providing quizzes or exercises over the telephone, and by monitoring each student's attentiveness during the recorded lectures by requiring each student to respond at intervals to voice prompts. The students' performance on taking the quizzes may be included in the reports generated by the system, or each student may be provided concurrently with the results of the quiz or exercise taken during a study session.

It is another object of the present invention to provide a system that enables students at remote locations to communicate with a central computer at a central location such as a school by entering coded messages via touch tone or rotary telephones.

It is yet another object of the present invention to provide a system that enables the users such as students individual control over pre-recorded educational programs stored in a central database such as a computer at a school.

It is still a further object of the present invention to provide an automatic system which is capable of producing reports listing the names of each student who has accessed the system, at what time, for how long, what material the student reviewed, and how many times the student used the fast forward, rewind and/or pause features. These reports could also include the results of quizzes taken by the students during the study period and whether or not a student failed to respond to voice prompts, which are intended to monitor the students' attentiveness while listening to a lesson.

The foregoing and other objects are realized, in accordance with the present invention, by a method for providing educational material for students at remote locations and for generating student activity reports, which includes the main steps of storing educational material in a computer system at a central location for playback to calling students at various other locations; receiving telephone calls by the computer system from calling telephones, the telephones being operated by respective calling students; receiving from the telephones identification codes, wherein an identification code identifies a respective calling student; creating telephone call records which store the received identification codes of the respective calling students; providing the calling students interactive access, through the corresponding telephones, to the stored educational material; permitting the calling students to select educational material from the educational material stored in the computer system for playback through the corresponding telephones; monitoring the activity of the respective calling students during their access to the stored educational material, and creating student activity records based on the monitoring, wherein the student activity records are correlated to the telephone call records of the respective calling students; and generating student activity reports based on the telephone call records and the student activity records of the respective calling students.

A system for providing educational material to students at remote locations and generating student activity reports thereof is provided, including a computer system at a central location and means for coupling the computer system to a telephone network; means for recording and storing educational material in the computer system; means for receiving telephone calls at the computer system from calling telephones located at various other locations; means for receiving from the calling telephones identification codes, wherein an identification code identifies a respective calling student; means for creating telephone call records in the computer system which store the received identification codes of the calling students; means for permitting the calling students to select educational material from the educational material stored in the computer system; means for providing the respective calling students interactive access to the selected portions of the stored educational material in the computer system; means for monitoring the activity of the respective calling students during their access to the stored educational material and means for creating student activity records in the computer system based on the monitoring, wherein the student activity records are correlated by the computer system to the telephone call records of the respective calling students; and means for generating student activity reports based on the telephone call records and the student activity records of the respective calling students.

Preferably, a method of the present invention accepts only authorized telephone calls. Authorized telephone calls include calls received with preauthorized ID codes or from pre-authorized telephone numbers, or both.

Other features and advantages of the present invention will become apparent from the following description of the invention which refers to the accompanying drawings.

BRIEF DESCRIPTION OF THE DRAWINGS

FIGS. 2A–E show some of the reports generated by the system of the present invention;

FIG. 3 is a block diagram of the basic hardware and major software blocks which comprise the present invention;

FIGS. 5(A)–(B) are flowcharts of another portion of the main computer program of FIG. 4;

DESCRIPTION OF THE PREFERRED EMBODIMENTS

Figure 1:
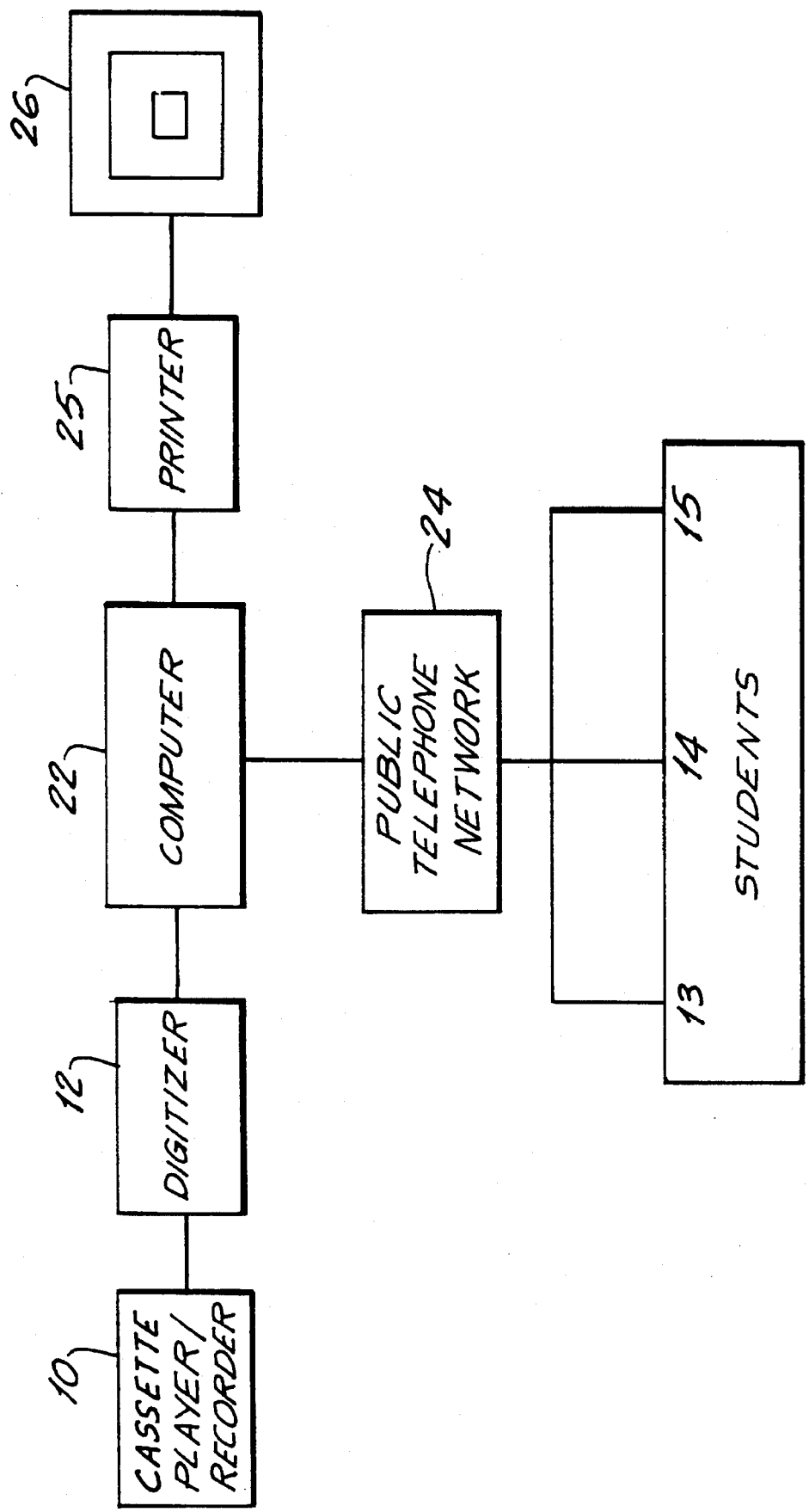
FIG. 1 is a schematic overview of the overall concept of the system of the present invention.

Referring to the drawings, FIG. 1 illustrates the overall concept of the present invention in accordance with which a teacher (not shown) prepares a standard audio cassette on a particular subject. This cassette is then taken to the school office, where the system administrator converts the audio cassette into a computer digitized voice file using a cassette player/recorder 10 and a digitizer 12. The computer digitized voice file is then stored in a computer 22. The method and the apparatus for converting a prerecorded audio tape into a digitized voice file are well known to those skilled in the computer art and, therefore, will not be discussed in detail here. Similarly, any computer system that meets the overall requirements of the remotely operable teaching system may be used in the practice of the invention.

That evening, students 13, 14, 15 call in through the public telephone network 24, identify themselves with personal user identification codes, and access specific, class authorized, lectures or other educational material stored in the computer 22. For example, students 13, 14, 15 at remote locations dial a telephone number into telephones (not shown). In actuality, the students 13, 14, 15 communicate with the remotely operable teaching system of the present invention by dialling a specified telephone number through the touch tone keypad (not shown) or, if not available, through the rotary dial of the telephones. As a result, communication is established by the students 13, 14, 15 at remote locations with the computer 22 located at a central location such as the office of a school, via the telephone network 24. The computer 22 receives the telephone calls and processes the information transmitted by the telephones. The system of the invention is not intended to be limited to a touch tone telephone. Therefore, known devices for converting a rotary dial signal into a touch tone signal may be included in the system.

The computer 22 provides voice prompts and instructions for forwarding to the students 13, 14, 15 over the telephone lines. At the beginning of each lesson, the teacher's name and the subject matter of the instructional material may be identified for the students 13, 14, 15. The time period for the lesson may also be provided, along with any special instructions that the teacher may have for all or specific students who access the recorded material. At this point, the students 13, 14, 15 could also be informed whether they are required to take a quiz or exercise as a part of their study session. The system of the invention envisions including voice mail capabilities for use by the students 13, 14, 15 and their teachers.

After the students 13, 14, 15 have been granted access to the educational material stored in the computer 22, all their activity while connected with the system is monitored and recorded by the computer 22, as further discussed in detail below. Moreover, at a teacher's discretion any student may be denied access to any or all of the material stored in the computer 22.

The system of the invention provides each student 13, 14, 15 with individual control over the material stored in the computer 22. This includes, without being limited to, the capability of selecting from among the material provided for a particular student's grade and class. Accordingly, a student may move from one recorded lesson to another thereby having the freedom of individually arranging the study sessions. Moreover, each student 13, 14, 15 has the capability of individually controlling the particular recorded material that they are reviewing. For example, each student 13, 14, 15 may fast forward, fast rewind or pause the recording that they are listening to so as to most efficiently utilize the educational material. The recorded material and/ or sections thereof may be played repeatedly. In one embodiment of the invention, the fast forward and rewind features may be timed increments, e.g., pressing 6, 6, # fast forwards the lecture five minutes ahead.

All students' activity is monitored and logged. Furthermore, if the teachers provide exercises or quizzes for testing the students, the results of each students' performance in taking these exercises are also stored in the computer 22. The system of the invention may also include the capability of allowing a student to take a quiz repeatedly, and for providing the student with the results immediately after the student completes the quiz, so that each student may self-evaluate their grasp of the educational material. In one mode, the quiz questions and the study materials may be correlated. Thereby, upon entering an incorrect response to a question, the student may operate the system to replay only that portion of the lecture where the correct answer to the quiz question can be found.

The following morning the system administrator generates reports 26, separated by grade and class, for distribution to the teachers. The reports 26 may be printed by a printer 25 connected to the computer 22.

The system may, for example, generate the following reports 26: A cumulative students' activity report, shown in FIG. 2A, which details overall students' usage and activity including programs accessed, time elapsed on each program, sections of program selected, time spent on each selection and total elapsed time for each user. This list of information that can be provided in the reports is not intended to be exhaustive, but is given merely as an example. Therefore, any reports that facilitate the function intended for the remotely operable teaching system may be generated by the system.

Individual student activity reports, shown in FIGS. 2B and 2C, which print out the activity of each individual student to demonstrate how much an individual student is using the system. A detailed version for each individual student, shown in FIG. 2B, can print information on each day's usage by an individual student of the remotely operable system including date and time accessed, programs accessed, duration, fast forwards, rewinds and disconnect. The individual student activity report may also be printed out as a summary of the activity of each individual student (FIG. 2C). For example, it may show the date, time, total number of programs accessed and duration on a daily basis. Such a report may also include the results of quizzes or exercises taken by the student and the level of attentiveness of the student to the lessons as measured by the student's responses to voice prompts interspersed in the lessons.

Figure 2D:
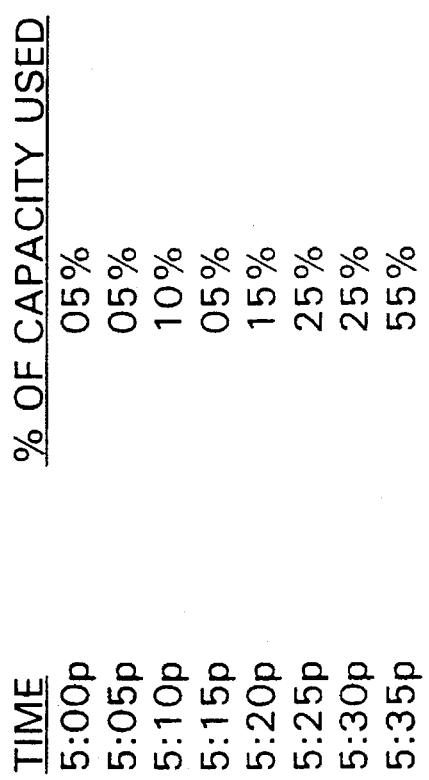

A system capacity report, shown in FIG. 2D, logs capacity usage in five minute intervals, and in summary form, by percentage of total capacity. This report helps determine if there is a need to expand the phone line capacity of the system. A quiz marking report, shown in FIG. 2E, may also be provided that is directed to quizzes, which are taken by the students during a study session, graded by student and grouped by class.

As seen in FIG. 3, the computer 22 comprises a CPU 28; a general I/O (input/output) circuitry 30 for communicating with a computer keyboard (not shown) and with other standard computer peripherals; telephone I/O hardware 32 by which the CPU 28 is capable of placing and receiving telephone calls over the telephone network 24; and a memory 34.

The memory 34 is associated with a program 36, a working memory, that is a scratch pad memory 38, a block of memory locations for a information database 40, and a further memory area 42 for the storage therein of 36.

The program 36, as is well known by persons skilled in the computer art, consists of specially prepared computer instructions which determine the overall flow as well as specific details of the sequence, flow, and organization of the functions carried out by the computer 22. The program 36 also includes instructions for communicating with standard, off-the-shelf application programs available from various vendors, for example, application programs which control the telephone I/O circuitry 32 and database handling software programs.

The main parts of the software program 36 are shown in FIGS. 4, 5(A)–(B) and 6(A)–(D).

As indicated by the line 37 (FIG. 3), the program 36 includes:

(a) the On-line phone program 44;

(b) the Record program 46; and (c) the Data files program 48.

Thus, at first, after performing an initialization routine (Step $S_1$), the program 36 enters a wait call state (Step $S_2$).

Normally, a telephone set or channel is in an "on-hook" condition, at which condition the telephone is ready to receive incoming calls. When the tip and ring wires of a telephone indicate an incoming call, the telephone answers the call by going "off-hook".

The software program 36 remains in the "wait call" state (Step $S_2$) while awaiting an incoming call. When a call is placed by a student 13, 14, 15 the program 36 proceeds to the "set off hook" state (Step $S_3$). In this state, the program 36 sets up the hardware to the off-hook condition, that is the call is answered and the software is ready to receive information originating from the telephones of the students 13, 14, 15. The program 36 then proceeds to the "play voice message" step (Step $S_4$), at which the software in block 50 (FIG. 3) is exercised to play voice messages which direct the telephone caller, for example, to enter an identification access code.

In response, after a student operates the touch tone pad or the rotary dial of the telephone, the program 36 proceeds to the Steps $S_5$ and $S_6$ where it receives and preferably verifies the incoming identification code data against information which is contained in the reference database 40. If the student fails to enter any information or does not complete entry of all of the necessary information within a preset time period, the program 36 returns to Step $S_4$ and plays an appropriate message. If after a set time or a number of tries, the correct information is not received, the program 36 progresses to the "play beep" state $S_{10}$ at which it sounds a beep indicating that the call is being terminated and then returns to Step $S_2$.

In one embodiment of the invention, if the ID number specified by a student is incorrect, an "invalid ID" message is heard and the request to enter a valid ID is repeated twice more in an attempt to give the student a chance to enter a valid ID. Should the student fail to specify a correct ID after three attempts, the line is automatically disconnected.

At all times, and regardless of the state of the program 36, the telephone I/O hardware 32 monitors whether the incoming telephone connection has been disconnected at the source for any reason. If it has, a "line disconnected" flag is activated and the program 36 transfers unconditionally to the "set on hook" state. There, appropriate procedures are executed which set the telephone I/O hardware 32 in the "on-hook" condition.

It should be noted that the telephone I/O hardware 32 contains several channels for simultaneously handling a plurality of telephone calls, the program 36 maintains the aforementioned states and executes the routines simultaneously and independently for the various telephone channels.

The On-line phone program 44 (shown in FIG. 4) contains the program instructions for receiving and/or placing telephone calls over the telephone network 24, via the telephone I/O hardware 32. Essentially, this program block 44 is responsible for initializing the telephone I/O hardware 32 and for initiating and permitting telephone communications to proceed including the playback of the educational material that is stored in the computer 22.

As discussed above, students may access the remotely operable teaching system by dialing an appropriate telephone number. The system responds with, for example, a welcome message and a request to enter a valid ID (Step $S_4$). The calling students then enter their identification number.

For example, each student may be provided with a unique four digit identification number. This unique identification number is used to track all of the student's activities for the duration of the call. The identification number may also identify each student using the teaching system by name, grade and by class.

After the calling students specify their ID numbers, and the ID numbers are preferably verified as valid (Step $S_5$ and Step $S_6$), each student is automatically taken to a prerecorded menu which is tailored for that particular student's grade and class. The program 36 of the system may be configured to the requirements of any type of school.

Figure 7:
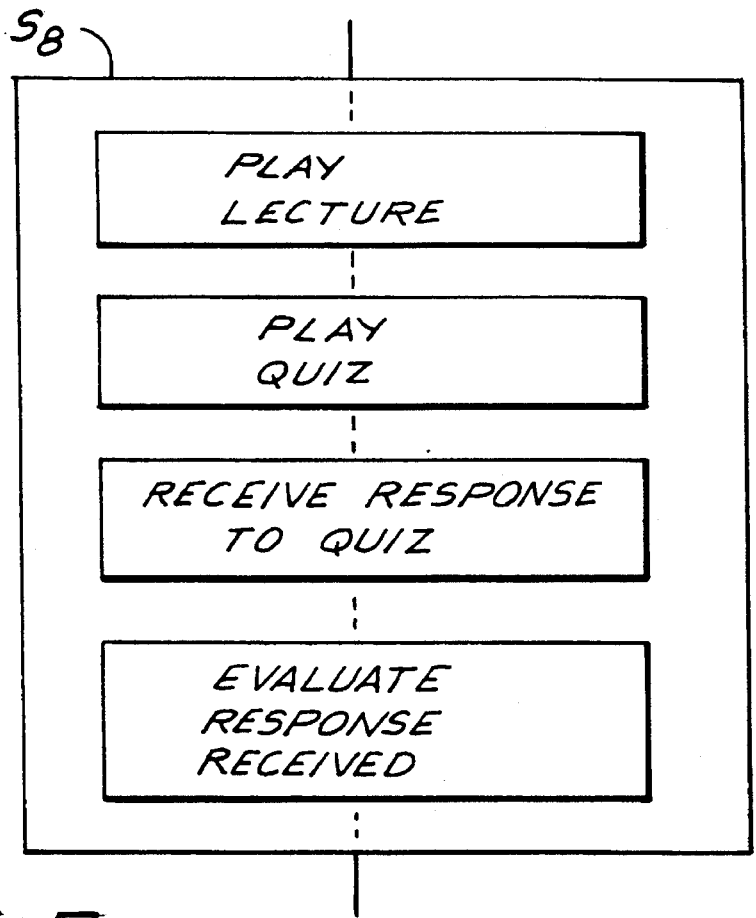
FIG. 7 shows step $S_8$ of the flowchart of FIG. 4.

When the student enters a valid ID, the system responds by taking the calling student to a prerecorded menu intended for that student's grade and class. The student then selects (Step $S_7$), via the touch tone pad or the rotary dial of the telephone, from the available recorded material, the educational material the student wishes to access. After the student selects material from the menu (Step $S_7$), the student will begin to hear the lecture assigned to that number (Step $S_8$). As previously discussed, teachers could provide exercises or quizzes for testing the students. FIG. 7 shows an optional structure for step $S_8$, which includes playing recorded quizzes to the calling students and receiving responses to the quizzes from the calling students for evaluating them substantially simultaneously, for example, by an evaluation program 53 (FIG. 3). At any time during the lecture the student can control the playback of the recorded lecture by the use of the touch tone pad or the rotary dial of the telephone (Step $S_9$). Given below as examples are some commands that may be used to control the playback of the educational material. Any such combinations may be created for controlling the playback of the recorded material.

To "Pause" pres

Pause will stay in effect until you pres

(Pause will automatically terminate after 2 minutes.

A student may also change programs at any time by pressin

[0]

As the data files being accessed are digitized voice files and not analog audio tapes, the forward and rewind commands are instantaneous. At any time during the playback of a recorded lesson a student may press a specified button on a touch tone pad or dial the number on a rotary dial so as to exit the recording which is currently being played. This command, zero in the above example, will take the student back to the main menu for that class so that the student may specify another lesson, or end the session.

Additionally, either in a random pattern or at fixed intervals, a tone interrupt is generated at which point the calling student hears a message, such as "press 3 to continue". The student is now required to respond to the voice prompt within, for example, five seconds. Failure to do so, could result in an automatic termination of the call. A record is made by the computer 22 of the student's response or lack thereof to the voice prompts interspersed throughout the recorded educational material. This feature of the invention is intended to ensure that the calling students are paying attention during the playback of the recorded lectures.

The system of the invention preferably records all of the above commands given by the student to control playback of the recorded material. This data is stored, for example, in a data collection file in the report data base 42. The next morning, or any time the system administrator desires, this file may be sorted by, for example, grade, class and alphabetized by student. Reports 26 may then be generated which allow the teachers to review the activities of each calling student during the prior evening study. The On-line phone program 44 provides for simultaneous access to the same educational material by any number of calling students limited only by the number of phone lines available.

The Record program segment 46 (shown in FIGS. 5(A)–(B)) of the system program 36 provides for the conversion of audio files into digitized voice files. This function may be accomplished, for example, as follows:

(a) the system administrator specifies the grade and class the administrator wishes to modify, (via, for example, a mouse) by clicking on the appropriate grade and class field;

(b) this calls up the next menu, which lists the lectures specified for that grade and class;

(c) after clicking on the appropriate lecture the administrator has the following options:

(1) OVERLAY—this function will replace the data currently stored in this file with the new material being entered at this time.

(2) ADD—this option will append new material to the end of the material current stored in this file.

(3) DELETE—this option will delete the data currently stored in the file.

(4) PLAY—this option allows the administrator to review and listen to the contents currently stored in the file.

The system administrator has the option of escaping the Record program 46 at any time. Multiple records can be simultaneously made. This feature is only limited by the number of phone lines accessing the system. In other words, theoretically, the number of lines going into the system is the maximum number of recordings that can be made at the same time.

The Data files program 48 (shown in FIGS. 6(A)–(D)) accesses the data entry and file maintenance menu. This program has two sections (FIG. 6A):

(a) Data file maintenance;

(b) Reports.

The data file maintenance segment of the Data files program 48 contains four programs;

(a) Student data file;

(b) Lecture data file;

(c) Teacher data file;

(d) Update of the data files.

A student data file (FIG. 6B) may include the following fields:

(a) Student ID—a numeric field which uniquely identifies the student;

(b) Grade—specifies each student's grade;
(c) Class—in cases where there are parallel classes, each class of the same grade level will have a unique number;
(d) Allow—specified with a yes or no, this field is used to allow or restrict access to the system to a particular student. This file also includes the first name, last name, address and phone number of each student.

The Data files program 48 allows modifications and control of the files by accessing a record by specifying various editing features available.

The lecture data file (FIG. 6C) of the data file maintenance segment contains the title of each lecture, specified by teacher and class in each grade. The fields within the program are as follows:

(a) Grade
(b) Class
(c) Teacher's name

There may be, for example, up to nine lectures fields to be specified. Access to this program is similar to that of the student data file. The teacher data file (FIG. 6D) contains the grade and class number as well as the teacher's name. This file is accessed by the system to define the report title under which each student should be listed on the student activity reports. The update data file may be used whenever changes are to be made to any of the above-referenced files. In consequence, when the student accesses the system, it will "read in" the latest modification to the files.

As discussed above, the On-line phone program 44 is responsible for receiving from the calling telephones (not shown), via the telephone I/O hardware 32, student identification information which the students 13, 14, 15 enter through the touch tone keypad or rotary dial of the telephone. This identification information is preferably verified against reference data, such as student identification code data, contained in the reference database 40, to screen or reject unauthorized telephone calls. A software routine 52 is responsible for relating the identification data entered by the calling students 13, 14, 15 with the identity of the respective students 13, 14, 15. This information is stored for later use in developing the reports 26.

The software routine 53 may be provided for evaluating substantially simultaneously responses received from the calling students to the quizzes. As previously discussed, exercises or quizzes may be provided as a part of the educational material stored in the system.

Upon verifying that the correct ID information has been received, a computer record is generated of the call. This function is carried at software block 54. At the conclusion of each day and/or any other desired or predefined reporting period, the software program 36 generates (within software block 56) various reports 26 pertaining to the respective students who call in and access the educational material stored in the computer system 22. This information is stored in the report database 42. As previously discussed above, the reports 26 may be run daily. These daily reports 26 may also be automatically printed each day without instructions from the system administrator.

Another major function of the program 36 includes generating and playing various voice messages and beeps (at block 50) which serve to direct and prompt the calling students 13, 14, 15 to enter the correct codes and information. The program 36 also generates voice prompts (at block 50) interspersed throughout the lessons stored in the CPU 28 to monitor and record the attentiveness of the students 13, 14, 15 using the lessons. These voice prompts may be randomly generated or generated at fixed intervals. The voice prompts instruct the students 13, 14, 15 listening to the lessons to respond by entering a specified number on the touch tone keypad or the rotary dial of the telephone. If a student fails to respond within a certain period of time, the telephone connection may be disconnected and a note made of the failure to respond. This information may then be included in the reports 26.

As previously discussed above, a further function provided by the program 36 involves receiving and/or sending voice messages to and from the students and their teachers. That is, the software block 60 is designed to receive from the teachers alphanumeric (ASCII) information comprising short messages which the software block 60 is configured to convert, by means of voice synthesizing circuitry, to voice messages which are then played to one or more student, at their homes. It is contemplated that such messages will be used to inform students of their upcoming work assignments.

Figure 4:
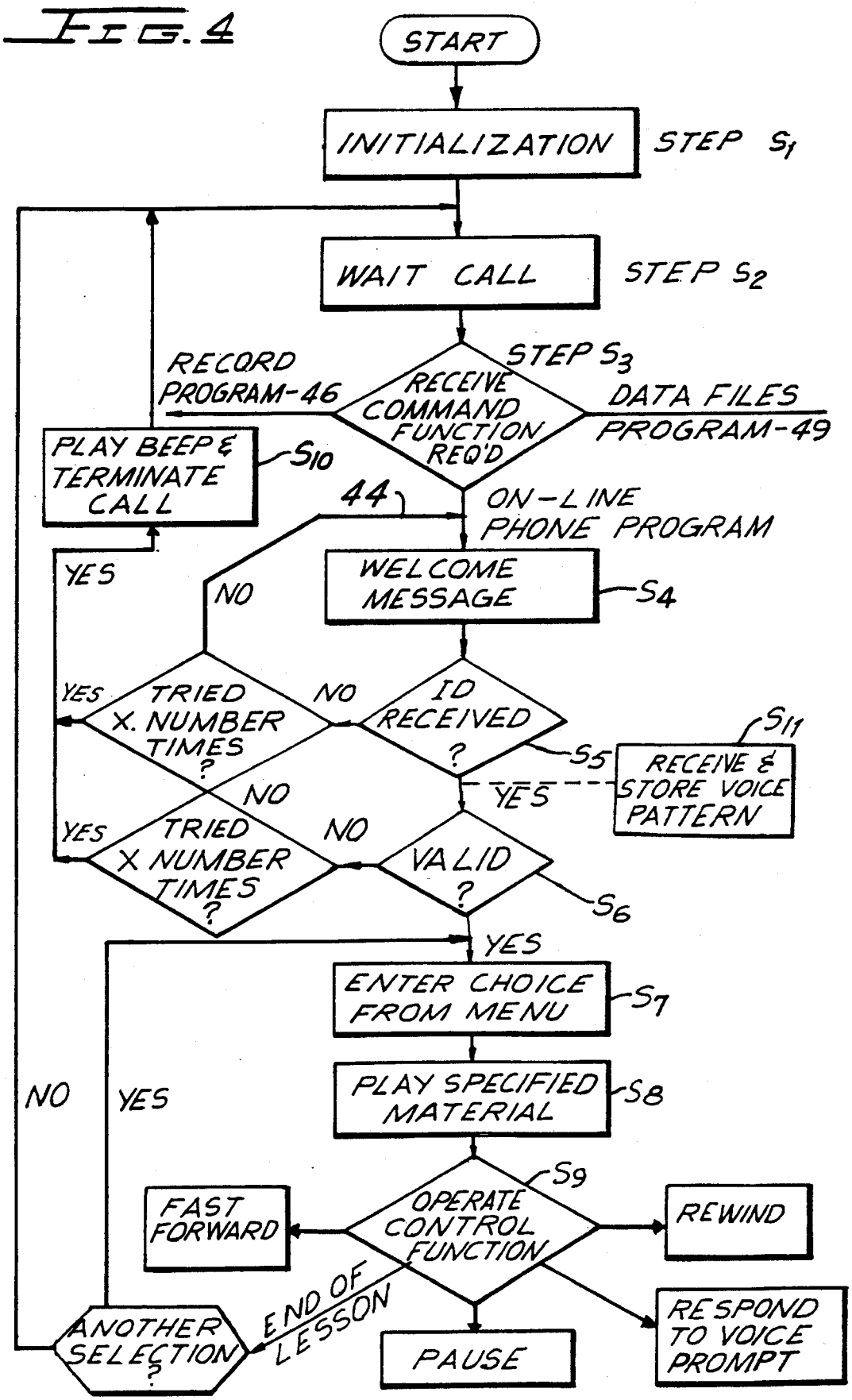
FIG. 4 is a flowchart of a portion of the main computer program of the present invention.
Figure 6A:
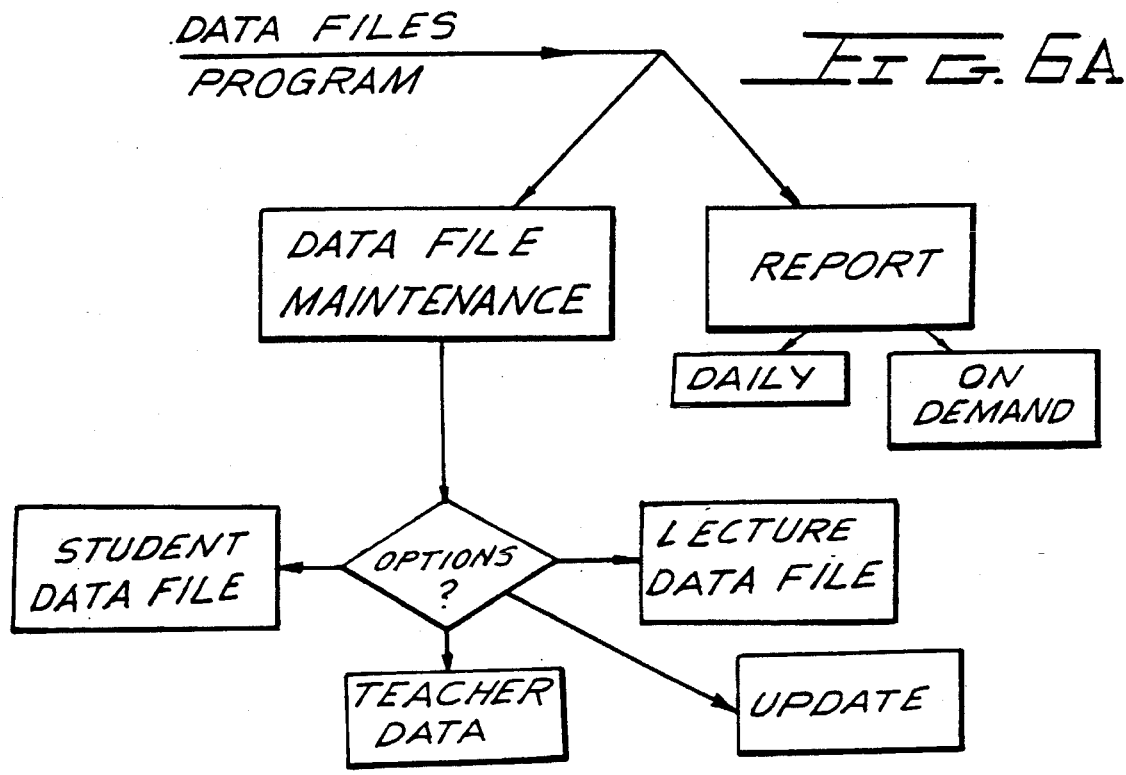
FIGS. 6(A)–(D) are flowcharts of yet another portion of the main computer program of FIG. 4.
Figures 6B, 6C, 6D:
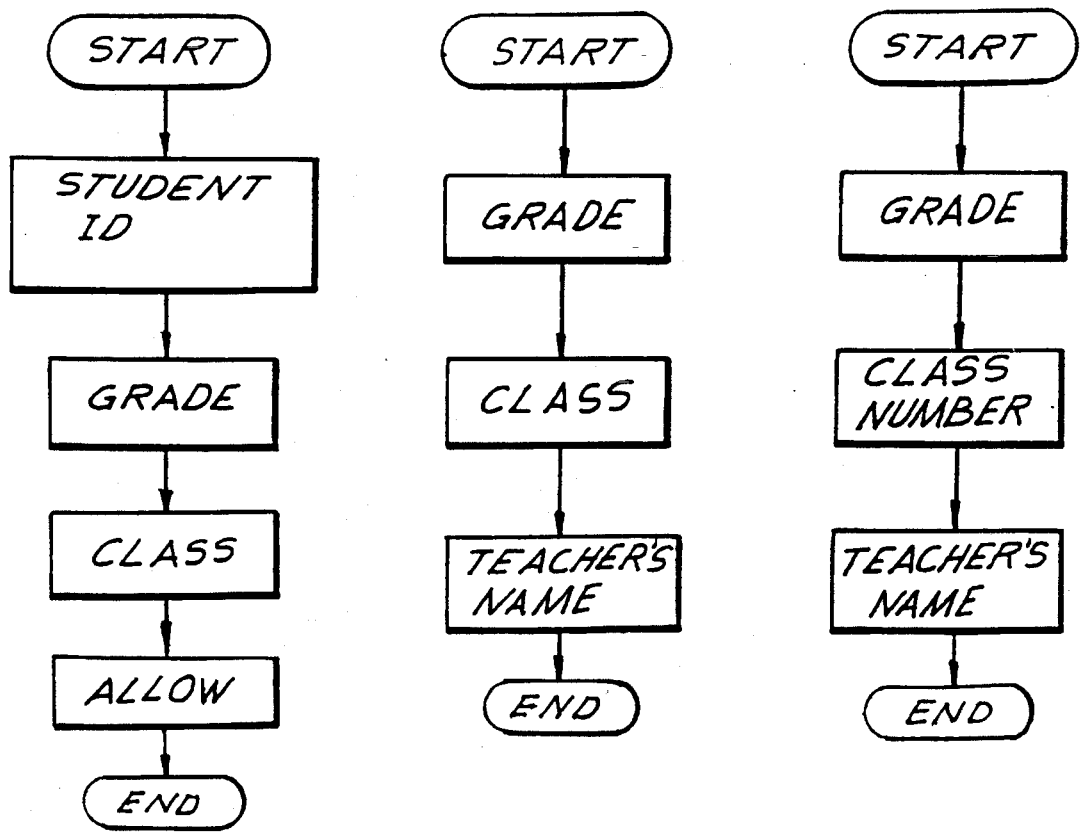
Figure 8:
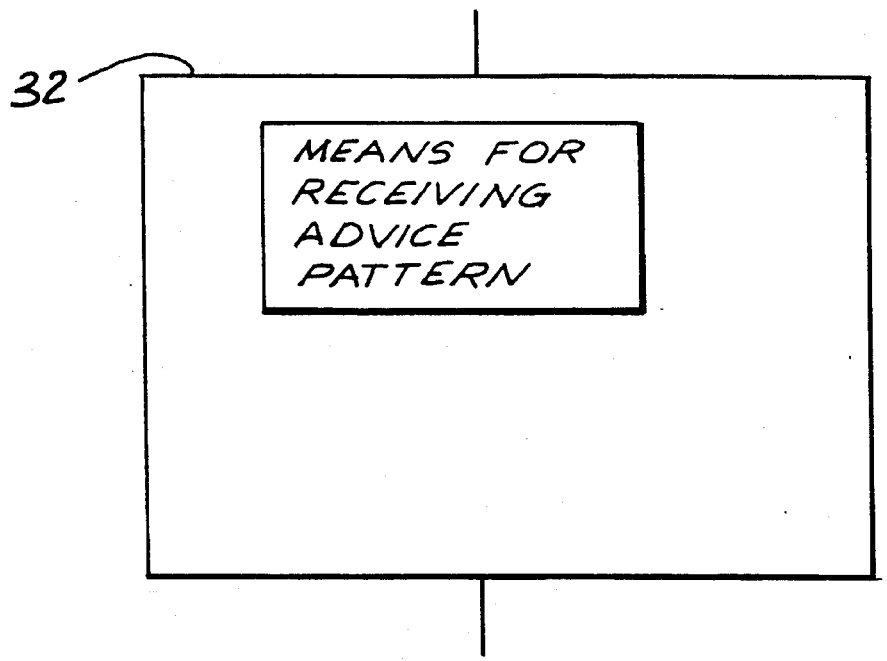
FIG. 8 shows the telephone I/O 32 of FIG. 3.

The present invention preferably further includes (as part of the telephone I/O circuitry) means for digitizing and storing short voice messages. These messages are appended to the telephone call record. With the recent introduction of and increasing availability of ISDN services from the telephone companies, the capability of transmitting large amounts of digital data over telephone wires has become possible, enabling forwarding of digitized voice messages to students 13, 14, 15. In this connection, the present invention contemplates to include a mode in which students 13, 14, 15 would be requested to enunciate a short standard phrase to be included with and stored as an appendage to each telephone record, as a means for assuring that students, 13, 14, 15 are not placing calls for one another. FIG. 4 shows the optional Step $S_{11}$ for receiving from the calling students voice patterns, and storing the voice patterns with the corresponding identification codes for further verifying the identity of the calling students. For example, the software routine 52 may be suitably modified for this purpose. FIG. 8 shows the telephone I/O 32 of FIG. 3 suitably modified for receiving voice patterns from the calling students.

Although the preferred embodiment of the invention has been described in relation to a telephone network, it is also envisioned that the present invention is applicable to interactive home systems, such as a home computer system or interactive television. Therefore, the method of the invention may be practiced using the monitor of a home computer or a television set to visually receive educational material stored in the central computer system and a keyboard associated with the home computer or television set to interact with the remotely operable system of the invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for providing educational material to students at remote locations and generating student activity reports thereof, the method comprising the steps of:

storing educational material in a computer system at a central location for playback to calling students at various other locations;

receiving telephone calls by the computer system from calling telephones, the telephones being operated by respective calling students;

receiving from the telephones identification codes, wherein an identification code identifies a respective calling student;

creating telephone call records which store the received identification codes of the respective calling students;

providing the calling students interactive access, through the corresponding telephones, to the stored educational material;

permitting the calling students to select educational material from the educational material stored in the computer system for playback through the corresponding telephones;

monitoring the activity of the respective calling students during their access to the stored educational material, and creating student activity records based on the monitoring, wherein the student activity records are correlated to the telephone call records of the respective calling students, the monitoring including periodically testing the calling students' attention during playback of the educational material; and generating student activity reports based on the telephone call records and the student activity records of the respective calling students.

2. The method of claim 1, further comprising providing a student identification code database containing valid student identification codes.

3. The method of claim 2, further comprising verifying the identification codes being received from the calling telephones against the valid student identification codes stored in the student identification code data base.

4. The method of claim 1, wherein the step of storing educational material in the computer system comprises preparing an audio cassette of material to be stored, and converting the audio cassette into a computer digitized voice file for storing in the computer system.

5. The method of claim 1, wherein the calling telephones are selected from a group consisting of touch tone telephones and rotary dial telephones.

6. The method of claim 1, further comprising the step of transmitting audible instructions from the computer system to the calling students through the corresponding telephones.

7. The method of claim 1, wherein the step of periodically testing the calling students includes transmitting audible instructions to the calling students to prompt the calling students to respond by a specified response to the computer system.

8. The method of claim 7, wherein the audible instructions direct the calling students to enter a specified number into their telephones within a specified period of time.

9. The method of claim 8, wherein the audible instructions are randomly generated.

10. The method of claim 1, further comprising receiving from each of the calling students a voice pattern, the respective voice patterns being stored with the corresponding identification codes for further verifying the identity of the respective calling students.

11. The method of claim 1, further comprising generating the reports daily.

12. The method of claim 1, further comprising generating the reports on demand.

13. The method of claim 1, further comprising selectively allowing and denying access to the educational material stored in the computer system to calling students based on the received identification codes.

14. The method of claim 1, wherein the step of providing the respective calling students interactive access to the stored educational material comprises providing fast forward, rewind, pause and exit functions so that the calling students can independently control playback of the stored educational material, and the step of monitoring the activity of the calling students comprises monitoring use by the respective calling students of the functions.

15. The method of claim 14, wherein the step of providing the calling students interactive access to the stored material further comprises receiving from the telephones predetermined signals for each of the fast forward, rewind, pause and exit functions.

16. The method of claim 15, wherein the fast forward, rewind and pause functions each operate for a predetermined period of time after the corresponding predetermined signals are received from the telephones.

17. The method of claim 1, further comprising providing recorded quizzes to the calling students.

18. The method of claim 17, further comprising evaluating substantially simultaneously responses received from the calling students to the quizzes.

19. A system for providing educational material to students at remote locations and generating student activity reports thereof, the system comprising:

a computer system at a central location and means for coupling the computer system to a telephone network;

means for recording and storing educational material in the computer system;

means for receiving telephone calls by the computer system from calling telephones located at various other locations;

means for receiving from the calling telephones identification codes, wherein an identification code identifies a respective calling student;

means for creating telephone call records in the computer system which store the received identification codes of the calling students;

means for providing the calling students interactive access to the stored educational material in the computer system;

means for permitting the calling students to select educational material from the educational material stored in the computer system for playback through the corresponding telephones;

means for monitoring the activity of the respective calling students during their access to the stored educational material and means for creating student activity records in the computer system based on the monitoring, wherein the student activity records are correlated by the computer system to the telephone call records of the respective calling students, said means for monitoring including means for periodically testing the calling students' attention during playback of the educational material; and means for generating student activity reports based on the telephone call records and the student activity records of the respective calling students.

20. The system of claim 19, further comprising a student identification code data base containing valid student identification codes.

21. The system of claim 20, further comprising means for verifying the identification codes received from the calling students against the valid student identification codes stored in the student identification code data base.

22. The system of claim 19, further comprising means for transmitting audible instructions from the computer system to the calling students.

23. The system of claim 19, further comprising means for receiving from each of the calling students a voice pattern, the respective voice patterns being stored with the corresponding identification codes for further verifying the identity of the respective calling students.

24. The system of claim 19, further comprising means for playing back the educational material selected by the calling students.

25. The system of claim 24, wherein the means for providing interactive access includes providing fast forward, rewind, pause and exit functions so that the respective calling students can independently control playback of the stored educational material.

26. The system of claim 19, further comprising means for providing recorded quizzes to the calling students and means for evaluating substantially simultaneously responses received from the calling students to the quizzes.

* * * * *